(12) United States Patent
Tin (10) Patent No.: US 7,414,631 B2
(45) Date of Patent: Aug. 19, 2008

(54) PERCEPTUAL GAMUT MAPPING WITH MULTIPLE GAMUT SHELLS

(75) Inventor: Siu-Kei Tin, Milpitas, CA (US)

(73) Assignee: Canon Kabushiki Kaisha, Tokyo (JP)

( * ) Notice: Subject to any disclaimer, the term of this patent is extended or adjusted under 35 U.S.C. 154(b) by 575 days.

(21) Appl. No.: 11/220,751

(22) Filed: Sep. 8, 2005

(65) Prior Publication Data

US 2007/0052719 A1    Mar. 8, 2007

(51) Int. Cl.
*G09G 5/02* (2006.01)
(52) U.S. Cl. .................. 345/590; 345/591; 382/167
(58) Field of Classification Search .......... None
See application file for complete search history.

(56) References Cited

U.S. PATENT DOCUMENTS

| | | | |
|---|---|---|---|
| 6,850,342 B2 | 2/2005 | Woolfe et al. ............... 358/1.9 |
| 7,177,465 B1 * | 2/2007 | Takahira ..................... 382/166 |
| 2005/0047648 A1 | 3/2005 | Newman et al. ............ 386/162 |
| 2005/0047654 A1 * | 3/2005 | Newman et al. ............ 382/167 |

OTHER PUBLICATIONS

G, Braun, et al., "Image Lightness Rescaling Using Sigmoidal Contrast Enhancement Functions", Journal of Electronic Imaging, vol. 8, (1999).
J. Morovic, et al., "Gamut Mapping Algorithms Based on Psychophysical Experiment", Proceedings of the 5th IS&T/SID Color Imaging Conference, 1997 (pp. 44-49).
J. Morovic, et al., "The Fundamentals of Gamut Mapping: A Survey" Journal of Imaging Science and Technology, Jul. 2000.
CIE Division 8: TC8-03—Gamut Mapping <http://www.colour.org/tc8-03/>, visited Sep. 2, 2005.
CIE Division 8: TC8-03—Public Gamut Mapping Algorithms Source Code <http://www.colour.org/tc8-03/pgma.html>, visited Sep. 2, 2005 (on CD).
G. Braun, et al., "General-Purpose Gamut Mapping Algorithms: Evaluation of Contrast-Preserving Rescaling Functions for Color Gamut Mapping", pp. 1-32, vol. 44, (2000).

* cited by examiner

*Primary Examiner*—Kee M. Tung
*Assistant Examiner*—Kevin K Xu
(74) *Attorney, Agent, or Firm*—Fitzpatrick, Cella, Harper & Scinto (57) ABSTRACT

An improvement to sigmoidal gaussian cusp knee (SGCK) gamut mapping algorithm useful for gamut boundary descriptors (GBDs) that are defined with multiple shells rather than a single hull. The gamut mapping algorithm involves a lightness-rescaling step and a chroma compression step, in which points on each of the shells of the source GBD are mapped to corresponding points on the respective shells of the destination GBD. In situations where there is a mismatch between the number of shells in the source GBD and the destination GBD, such as a case where one of the GBDs is defined by a singly-shelled GBD whereas the other is defined by a two-shelled GBD, an induced hue slice may be constructed so as to simulate the missing shell. In addition, an induced hue slice may be constructed in a situation where lightness rescaling results in a mapping that is too steep between source and destination.

9 Claims, 10 Drawing Sheets

PERCEPTUAL GAMUT MAPPING WITH MULTIPLE GAMUT SHELLS

BACKGROUND OF THE INVENTION

1. Field of the Invention
2. Related Art

The need for gamut mapping arises in cross-media/cross-device image reproduction. The difference in gamut mapping among different devices/media requires re-mapping of colors such that colors in the source gamut are mapped to within the destination gamut so that they can be reproduced on the destination device/medium. In addition, there are many different ways to achieve this, resulting in different "rendering intents." For example, ICC (International Color Consortium, www.color.org) profiles support four different rendering intents, called Perceptual, Relative Colorimetric, Saturation and Absolute Colorimetric. The perceptual rendering intent strives at optimizing color reproduction for photographic images. The present invention involves gamut mapping for the perceptual rendering intent.

While the rendering intent sets up a directive for the design of the gamut mapping algorithm, it does not in general define a particular algorithm. Perceptual intent, for example, can be implemented with several possible algorithms. One of the algorithms suggested by CIE TC8-03 division is the SGCK ("Sigmoidal Gaussian Cusp Knee") algorithm. This algorithm is a combination of the GCUSP algorithm by Morovic (J. Morovic and M. R. Luo: Gamut Mapping Algorithms Based on Psychophysical Experiment, *Proceedings of the 5th IS&T/SID Color Imaging Conference*, 44-49 (1997)) and the Sigmoidal lightness rescaling algorithm by Braun (G. J. Braun and M. D. Fairchild: Image Lightness Rescaling using Sigmoidal Contrast Enhancement Functions, *Journal of Electronic Imaging*, Vol. 8, 380-393 (1999). These articles are incorporated herein by reference. The SGCK algorithm is known and in general comprises two steps: a lightness rescaling step, and a chroma compression step.

The SGCK algorithm works well for gamut boundary descriptors (GBD) that have a single convex hull in both the source and the destination. Recently, however, GBDs have been described that have multiple hulls, or "shells". See U.S. Application Publication No. 2005/0047648, "Color Descriptor Data Structure" by Newman et al., and U.S. Application Publication No. 2005/0047654, "Gamut Mapping Between Multiple Boundary Regions" by Newman et al. These published applications are incorporated herein by reference.

SUMMARY

The invention is a modification to the SGCK algorithm which works when one or both of the source and the destination include GBDs having multiple shells, such as a two-shelled GBD with a reference shell and a plausible shell. According to the invention, to gamut map from a source color to a destination color so as to preserve a perceptual rendering intent, gamut boundary descriptors (GBDs) are obtained for each of the source and the destination, wherein both of the source GBD and the destination GBD each includes at least a first shell and a second shell which is mostly contained by the first shell. The first shell, for example, might be a plausible shell, whereas the second shell might be the reference shell which is mostly contained by the plausible shell. Lightness of the source color is rescaled so as to obtain lightness of the destination color. Lightness rescaling defines a lightness mapping of the first shell of the source GBD to the first shell of the destination GBD, and of the second shell of the source GBD to the second shell of the destination GBD. Chroma of the source color is compressed so as to obtain chroma of the destination color, wherein chroma compression defines a chroma mapping of the first shell of the source GBD to the first shell of the destination GBD, and of the second shell of the source GBD to the second shell of the destination GBD. Together, the lightness rescaling and the chroma compression define the lightness and chroma of the destination color based on the source color, thereby achieving the desired gamut mapping.

Preferably, the lightness mapping includes a piecewise continuous function which is linear outside the second shells of the source and destination GBDs, and which is sigmoidal between the second shells of the source and destination GBDs. A weighting factor may be included which depends on chroma.

With respect to the chroma mapping, the chroma mapping preferably includes a piecewise continuous function that is piecewise linear and that compresses chroma towards a cusp in the first shell of the destination GBD. So as to avoid unintended chroma expansion, and so as to ensure that the chroma mapping is not discontinuous and does not include regions that are too steeply sloped, each piecewise linear portion in the chroma mapping may be bounded by the identity function.

It is possible that in gamut mapping from the source to the destination, one of the source and destination GBDs might not include a multiple-shelled GBD. An example of a situation where a singly-shelled GBD might be encountered is for non HDR images (i.e., high dynamic range). In such a case, a hue slice is constructed for the singly-shelled GBD, in correspondence to the second shell. The hue slice so constructed is referred to herein as an "induced" hue slice. In this case, since the induced hue slice corresponds to the second shell, it is mostly contained by the existing single shell of the GBD.

In this aspect, therefore, the invention comprises gamut mapping which preserves a perceptual rendering intent between a source and a destination when one or both of the source and destination might include a GBD having multiple shells. If both the source and the destination GBD are singly-shelled, then a standard SGCK algorithm is applied so as to map from the source to the destination. If only one of the source or destination includes multiple shells, whereas the other includes only a single shell, then an induced hue slice is constructed which simulates the missing shell for the one-shelled GBD, whereafter processing proceeds as described above for gamut mapping wherein each of the source and destination have multiply-shelled GBDs. Likewise, where both of the source and destination GBDs already have a multiply-shelled structure, the aforementioned SGCK algorithm is applied.

An induced hue slice might also be constructed in another case, corresponding to a situation where both of the source and destination already have multiply-shelled GBDs, but the slope of lightness resealing results in a lightness mapping that is too steep. In such a situation, an induced hue slice is constructed in correspondence to the first (larger) shell, and the existing first shell is discarded. This induced hue slice for the newly-constructed first shell is strictly smaller than the discarded first shell, and ensures that lightness rescaling is not too steep.

This brief summary has been provided so that the nature of the invention may be quickly understood. A more complete understanding of the invention may be obtained by reference to the following detailed description in connection with the attached drawings.

DETAILED DESCRIPTION OF THE PREFERRED EMBODIMENTS

Figure 1:
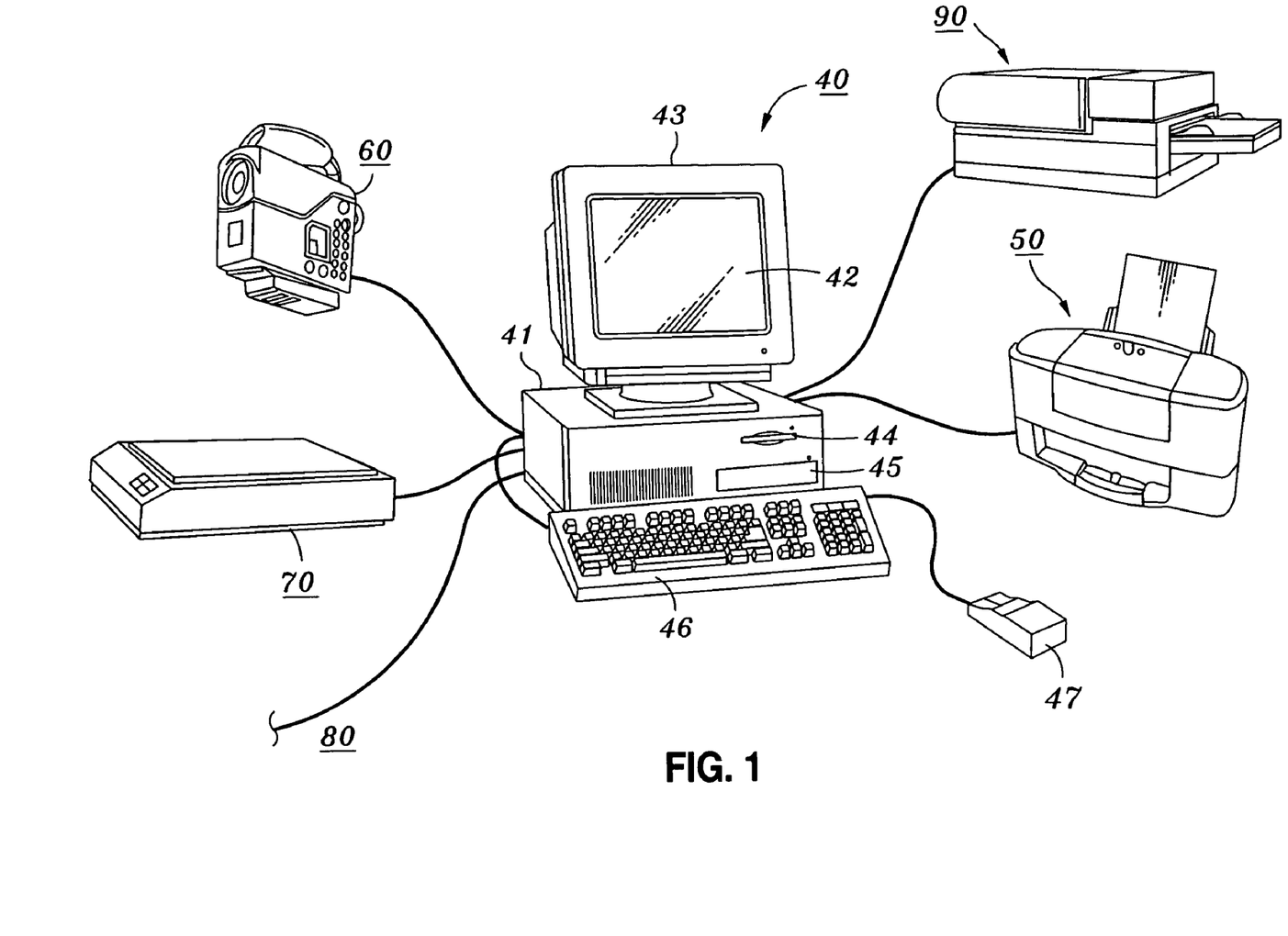
FIG. 1 is a representative view of a computing environment in which the present invention may be implemented according to one embodiment of the invention.

FIG. 1 shows a computing environment in which the present invention may be implemented. FIG. 1 depicts a representative computing system including computing equipment, peripherals and digital devices which may be used in connection with the practice of the present invention. Computing equipment 40 includes host 41 which generally comprises a personal computer (hereinafter "PC") having an operating system such as Microsoft® Windows® or Apple® Mac OS® or LINUX. Computing equipment 40 includes color monitor 43 including display screen 42, keyboard 46 for entering text data and user commands, and pointing device 47. Pointing device 47 preferably comprises a mouse for pointing and for manipulating objects displayed on display screen 42.

Computing equipment 40 also includes computer-readable memory media such as computer fixed disk 45 and floppy disk drive 44. Floppy disk drive 44 provides a means whereby computing equipment 40 can access information, such as image data, computer-executable process steps, application programs, etc. stored on removable memory media. In an alternative, information can also be retrieved through other computer-readable media such as a USB storage device connected to a USB port (not shown), or through network interface 80. Also, a CD-ROM drive and/or a DVD drive (not shown) may be included so that computing equipment 40 can access information stored on removable CD-ROM and DVD media.

Printer 50 is a color bubble jet printer, and is a first example of a color output device which forms color images on a recording medium such as paper or transparencies or the like. Printer 90 is a color laser printer, and is a second example of a color output device which also forms color images on a recording medium such as paper or transparencies or the like. Preferably, printer 50 and printer 90 form color images using cyan, magenta, yellow and black inks, although the present invention can be used with printers and devices which use other colorant combinations that include black. The invention is also usable with other color output devices, such as projectors, displays and the like, so long as the color output device is capable of being interfaced to computing equipment 40.

Digital color scanner 70 is a first example of a color input device, and is provided for scanning documents and images and sending the corresponding image data to computing equipment 40. Digital color camera 60 a second example of a color input device, and is provided for sending digital image data to computing equipment 40. Of course, computing equipment 40 may acquire digital image data from other sources such as a digital video camera, a local area network or the Internet via network interface 80.

Figure 2:
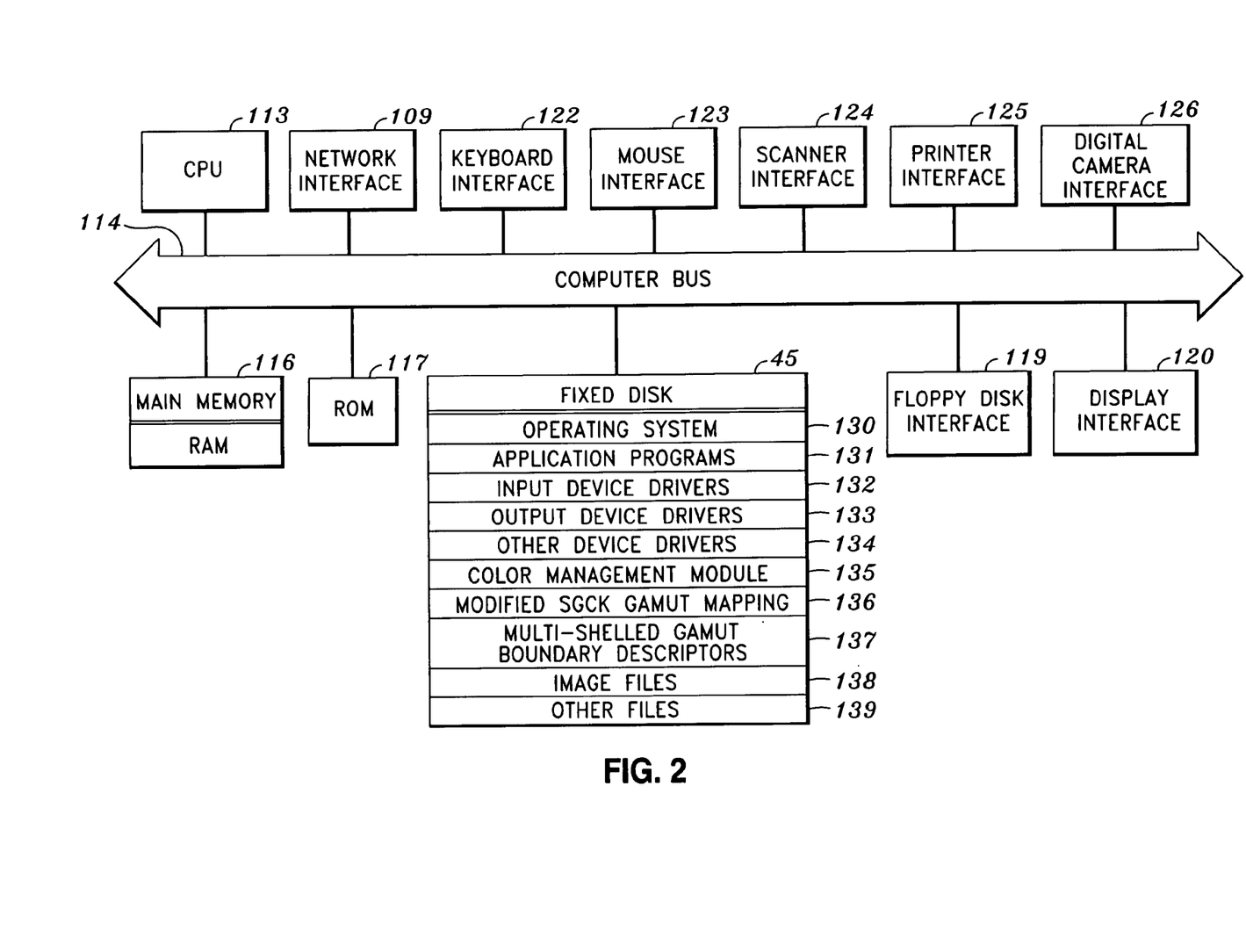
FIG. 2 is a detailed block diagram depicting the internal architecture of the computing device shown in FIG. 1 according to one embodiment of the invention.

FIG. 2 is a detailed block diagram showing the internal architecture of host processor 41 of computing equipment 40. As shown in FIG. 2, host processor 41 includes central processing unit (CPU) 113 which interfaces with computer bus 114. Also interfacing with computer bus 114 are fixed disk 45, network interface 109, random access memory (RAM) 116 for use as a main run-time transient memory, read only memory (ROM) 117, floppy disk interface 119, display interface 120 for monitor 43, keyboard interface 122 for keyboard 46, mouse interface 123 for pointing device 47, scanner interface 124 for scanner 70, printer interface 125 for printers 50 and 90, and digital camera interface 126 for digital camera 60.

RAM 116 interfaces with computer bus 114 so as to provide information stored in RAM 116 to CPU 113 during execution of software programs such as an operating system, application programs, color management modules, and device drivers. More specifically, CPU 113 first loads computer-executable process steps from fixed disk 45, or another storage device into a region of RAM 116. CPU 113 can then execute the stored process steps from RAM 116 in order to execute the loaded computer-executable process steps. Data such as color images or other information can be stored in RAM 116, so that the data can be accessed by CPU 113 during the execution of computer-executable process steps need to access and/or modify the data.

As also shown in FIG. 2, fixed disk 45 contains operating system 130, application programs 131, such as word processing programs or a graphic image management programs. Fixed disk 45 also contains device drivers for software interface to devices, such as input device drivers 132, output device drivers 133, and other device drivers 134. Image files 138, including color image files, and other files 139 are available for output to color output devices and for manipulation by application programs.

Color management module (CMM) 135 manages colors during transport of an image from a source device to a destination device, such as from capture by digital camera 60 to printout by printer 50. CMM 135 generally comprises process steps that accept a source image in a source device dependent color system and generate a destination image in a destination device dependent color system. Using color profiles or other color characterizations of the source and destination device, CMM 135 will generally transform the source image to a device independent color system, possibly to a perceptual color system for better interpretation of rendering intent and better preservation of color fidelity, apply a gamut mapping from source to destination and then transform the gamut-mapped image to the destination device dependent color system. CMM 135 may be configured as a part of operating system 130, as part of an output device driver such as a printer driver, or as a stand-alone application program; it may also be configured as a plug-in or dynamic link library (DLL) to the operating system, device driver or application program.

One gamut mapping available to CMM 135 is modified SGCK gamut mapping 136. During gamut mapping, SGCK gamut mapping 136 accesses multi-shelled gamut boundary descriptors (GBDs) 137). Operation of modified SGCK gamut mapping 137, and properties and construction of multi-shelled GBDs 137, are discussed in more detail below.

"Shells" arise in various contexts in GBD modeling of devices. In the two aforementioned published applications by Newman, et al., it was proposed that the GBD should consist of several gamut shells. In respect of this additional shell structure, modified SGCK gamut mapping 136 is designed to map a shell in the source GBD to the corresponding shell in the destination GBD.

For different devices, including some "virtual devices" such as some RGB-based color spaces (e.g. sRGB space), construction of the gamut shell structure is an art that depends on the goal to be achieved, and it is highly device dependent. It is not the purpose of this invention to describe derivation of multi-shelled GBDs. However, to illustrate that it can be done, the following demonstrates how a 2-shell structure can be constructed for RGB capture devices.

Capture devices, such as scanners and cameras, are unique among all device classes in that, in the process to gather measurement data for device modeling, it is not possible to sample the device space uniformly, or in a user-specified manner. This is because a capture device would respond to external, device-independent stimuli as input, generating device values as output, not the other way. In other words, it is not possible to drive the capture device by specifying device values. A standard way to gather data for model characterization of a capture device is to use a characterization target, such as IT8.7 or Color Checker. Such targets have pre-defined XYZ values under specific operating conditions (illuminant, lighting, etc). An RGB capture device would respond to these XYZ stimuli with corresponding RGB values. A model of the device can be constructed after we analyze the relationship between the XYZ values and the device values. Incidentally, a "Reference Shell" can be constructed by taking the hull of the set of device independent colors obtained by routing the response RGB values through the device model. As should be clear, these RGB responses in general do not span the whole RGB space. So a "Plausible Shell" is constructed by constructing a hull of the set of device independent colors obtained by routing a regular sampling of the RGB space through the device model. In general, the Plausible Shell is strictly larger than the Reference Shell. In the case of capture devices, the Reference Shell is achievable by construction because it is generated by a characterization target. The Plausible Shell contains all colors possible from the device model, but there is no a priori knowledge that all the colors contained in it are achievable, because some RGB values may not be responses to any real life stimuli.

Modified SGCK gamut mapping 136 is an enhanced generalization of known SGCK mapping for the case where at least one of the GBD's, either from the source device or the destination device, has a 2-shell or a multi-shelled structure. For a 2-shell structure, the inner shell will be called the Reference Shell, while the outer shell will be called the Plausible Shell. The cases considered are:

(a) Both the source GBD and destination GBD have a 2-shell structure (b) The source GBD has a 2-shell structure; the destination GBD has only 1 shell (c) The source GBD has only 1 shell; the destination GBD has a 2-shell structure (d) Both the source GBD and destination GBD have only 1 shell Case (d) is just the well-known case. In cases (b) and (c), modified SGCK gamut mapping 136 introduces an intermediate geometric structure, called the "Induced Hue Slice", for the GBD that does not have 2 shells. The Induced Hue Slice will play a role that is similar to a hue slice that would be obtained if there was a shell. Construction of Induced Hue Slice is discussed below in a separate section titled "Induced Hue Slice". The general SGCK algorithm with 2 shells will be described for case (a), with the understanding that once the Induced Hue Slice construction is made known, the algorithm for case (a) can be applied to case (b) and (c) as well, with the Induced Hue Slice used in place of the hue slice constructed from a real shell. It is an advantage of this generalized SGCK algorithm for 2 shells that it is "continuous", in the sense that if the Reference Shell and Plausible Shell collapse onto one another, the algorithm will reduce to the standard one.

In order to describe the algorithm for case (a), the existing SGCK algorithm is formulated in a way that is suitable for generalization. It is convenient to break it down into 2 main steps, "Lightness Rescaling" and "Chroma Compression". Both will need to be generalized to the 2-shell setting.

The color space used herein is the CAM space as defined in CIECAM02. It should be noted that special properties of this CAM space are not being used, so other CAM spaces, including the older CIELAB, can be substituted without significant change.

[Standard SGCK (Prior Art)]

Figure 3:
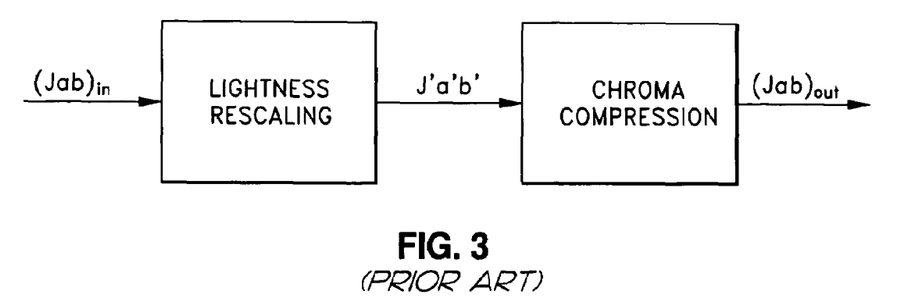
FIG. 3 is a functional view of the two steps in known SGCK gamut mapping.
Figure 4:
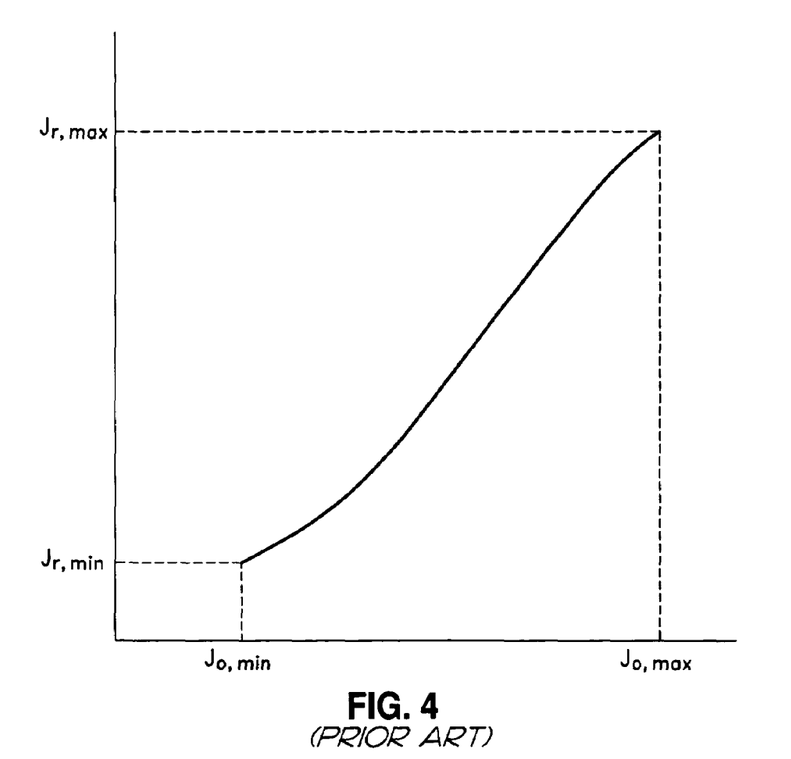
FIG. 4 is a view of a sigmoidal curve used in lightness resealing.

The known SGCK algorithm consists of 2 steps, "Lightness Rescaling" and "Chroma Compression", see FIG. 3. The Lightness Rescaling module implements the sigmoidal lightness compression described in the aforementioned article by Braun, see FIG. 4. The sigmoidal compression maps the tonal range of the source device, $[J_{o,min}, J_{o,max}]$ to the tonal range of the destination device, $[J_{r,min}, J_{r,max}]$. It compresses lightness using the sigmoidal function instead of linear function, which allows for more encoding space for mid-tones. In addition, SGCK implements a chroma-dependency to the lightness resealing, reducing the rescaling effect as chroma increases. That is, $$J_r = (1-p_c)J_o + p_c J_s$$

where $J_o$, $J_r$ are respectively the original (input) and reproduction (output) lightness, $J_s$ is the result of applying the sigmoidal function to $J_o$, and $p_c$ is a weighting factor, given by $$p_c = 1 - ((C^3)/(C^3 + 5 \times 10^5))^{1/2}$$

For reference later, a simple notation is used for the sigmoidal function:

$$J_s = S(J_o; J_{o,min}, J_{o,max}; J_{r,min}, J_{r,max})$$

One side note: Although the name "Lightness Rescaling" is used for this step, it is possible that it does more than just sigmoidal compression. For example, one can also implement, in addition to sigmoidal compression, a transform that will perform gray balance, in which case the step might change a and b as well as J. In other words, it is not assumed that the Lightness Rescaling step changes J only.

Figure 5:
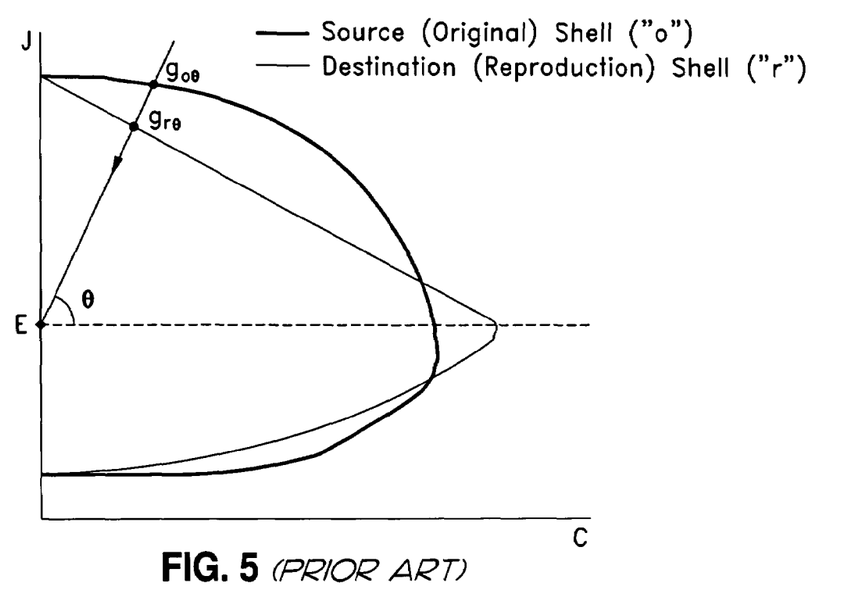
FIG. 5 is a view of the geometry of chroma compression.
Figure 6:
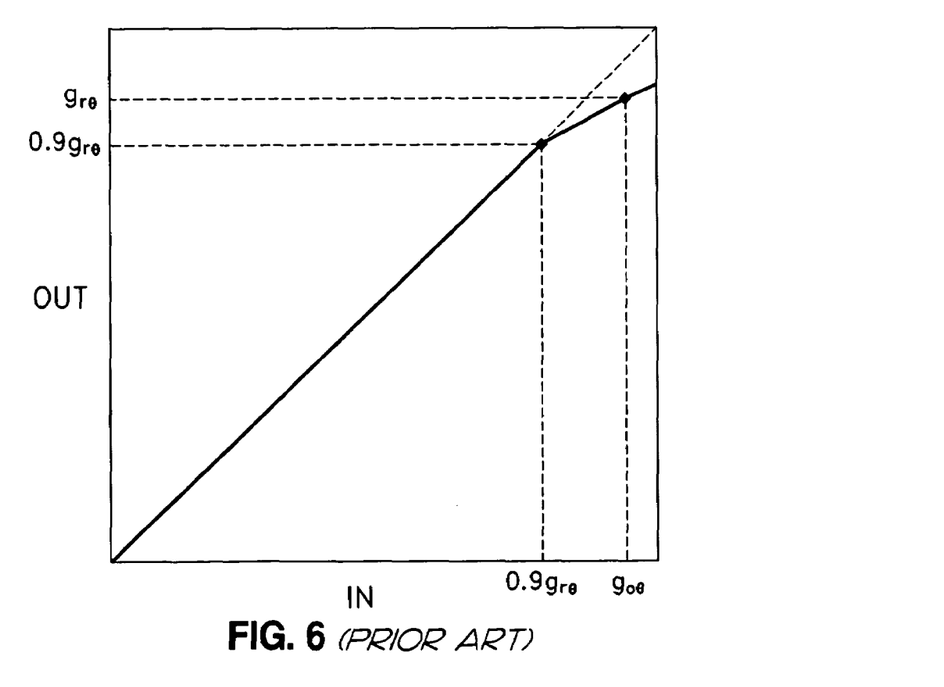
FIG. 6 is a graph showing the effect of a knee function during chroma compression.

The Chroma Compression step uses not the original source shell, but the shell obtained by applying the Lightness Rescaling to the original source shell. Because the Lightness Rescaling matches up the $J_{max}$'s and $J_{min}$'s, the "rescaled" source shell will have the same $J_{max}$ and $J_{min}$ as the destination shell, see FIG. 5. For convenience, the rescaled source shell is referred to as simply the source shell. Compression is performed towards the "knee point", which is the point on the J-axis that has the same J as the cusp of the destination shell. More specifically, points on the line joining the knee point and the input point are mapped according to the Knee Function, see FIG. 6. This is a piecewise linear function consisting of 2 linear pieces. Moreover, it only compresses colors beyond the "last" 10% of the gamut of the destination device, and leaves 90% of the destination gamut fixed.

[Modified SGCK Gamut Mapping For 2 Shells]

Both the Lightness Rescaling and Chroma Compression modules need to be modified to support the use of 2 shells. As we mentioned before, it is assumed that both source and destination GBD's have a 2-shell structure. If this assumption is not correct, then an induced hue slice is created as mentioned above.

[Generalized Lightness Rescaling]

Existence of 2 shells for both source and destination GBD means that a set of 4 points is mapped from the source GBD to a corresponding set in the destination GBD:

$$(J_{o,min,pla}, J_{o,min,ref}, J_{o,max,ref}, J_{o,max,pla}) \rightarrow (J_{r,min,pla}, J_{r,min,ref}, J_{r,max,ref}, J_{r,max,pla})$$

where the subscripts have the following meanings:
o or r: "original" (source) or "reproduction" (destination)
min or max: minimum neutral lightness or maximum neutral lightness
pla or ref: Plausible Shell or Reference Shell The ordering in each quadruple is also the expected relative magnitudes of these points.

The Lightness Rescaling map uses similar equations as in the standard case:

$$J_r = (1-p_c)J_o + p_c J_s$$

$$p_C = 1 - ((C^3)/(C^3 + 5 \times 10^5))^{1/2}$$

but $J_s$ is defined in a piecewise manner as follows:

$$J_s = \begin{cases} J_{r,max,ref} + \frac{J_{r,max,pla} - J_{r,max,ref}}{J_{o,max,pla} - J_{o,max,ref}}(J_o - J_{o,max,ref}) & \text{if } J_o \geq J_{o,max,ref} \\ S(J_o; J_{o,min,ref}, J_{o,max,ref}; J_{r,min,ref}, J_{r,max,ref}) & \text{if } J_{o,min,ref} < J_o < J_{o,max,ref} \\ J_{r,min,ref} + \frac{J_{r,min,pla} - J_{r,min,ref}}{J_{o,min,pla} - J_{o,min,ref}}(J_o - J_{o,min,ref}) & \text{if } J_o \leq J_{o,min,ref} \end{cases}$$

Figure 7:
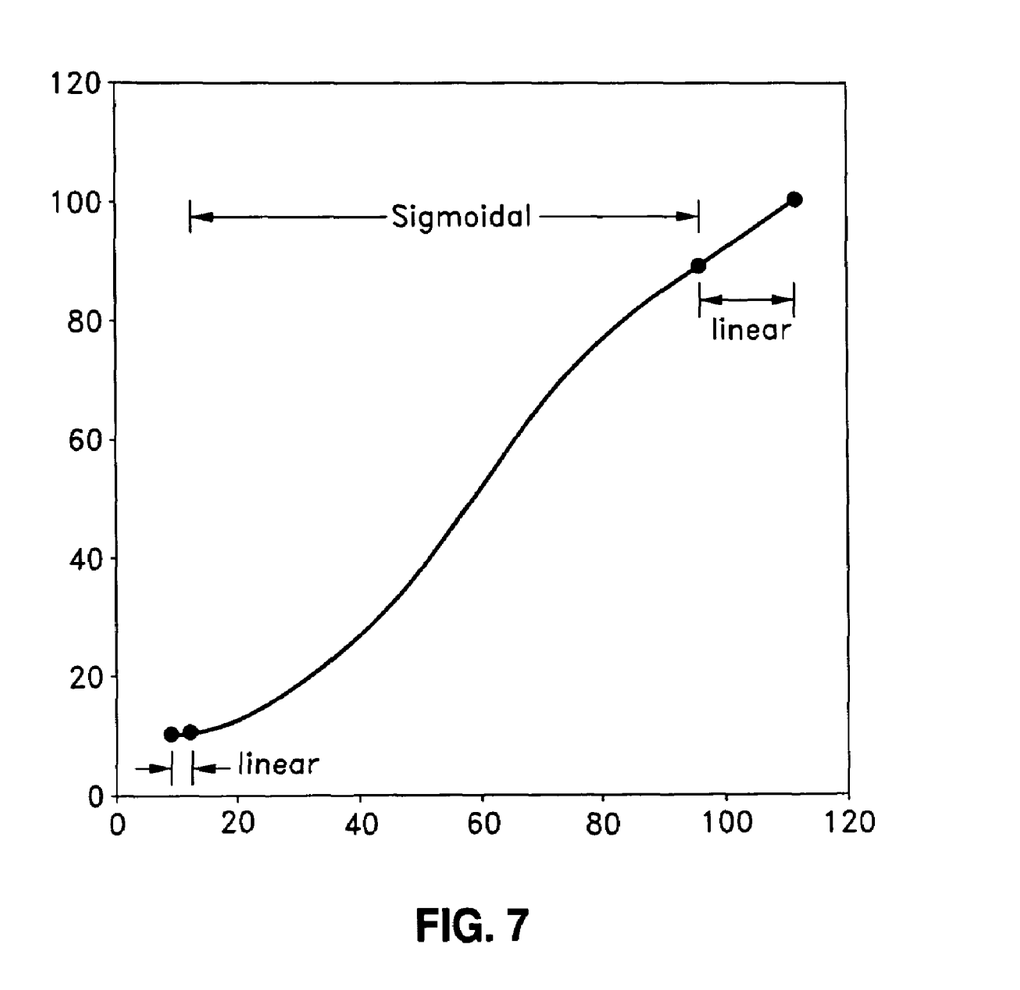
FIG. 7 is a view showing the linear sigmoidal regions of lightness resealing in one embodiment of modified SGCK gamut mapping according to the invention.

In other words, lightness rescaling maps the reference shell of the original source to the reference shell of the destination, and maps the plausible shell of the original source to the plausible shell of the destination. The mapping is sigmoidal within the reference shell, and linear outside. See FIG. 7.

[Generalized Chroma Compression]

Figure 8:
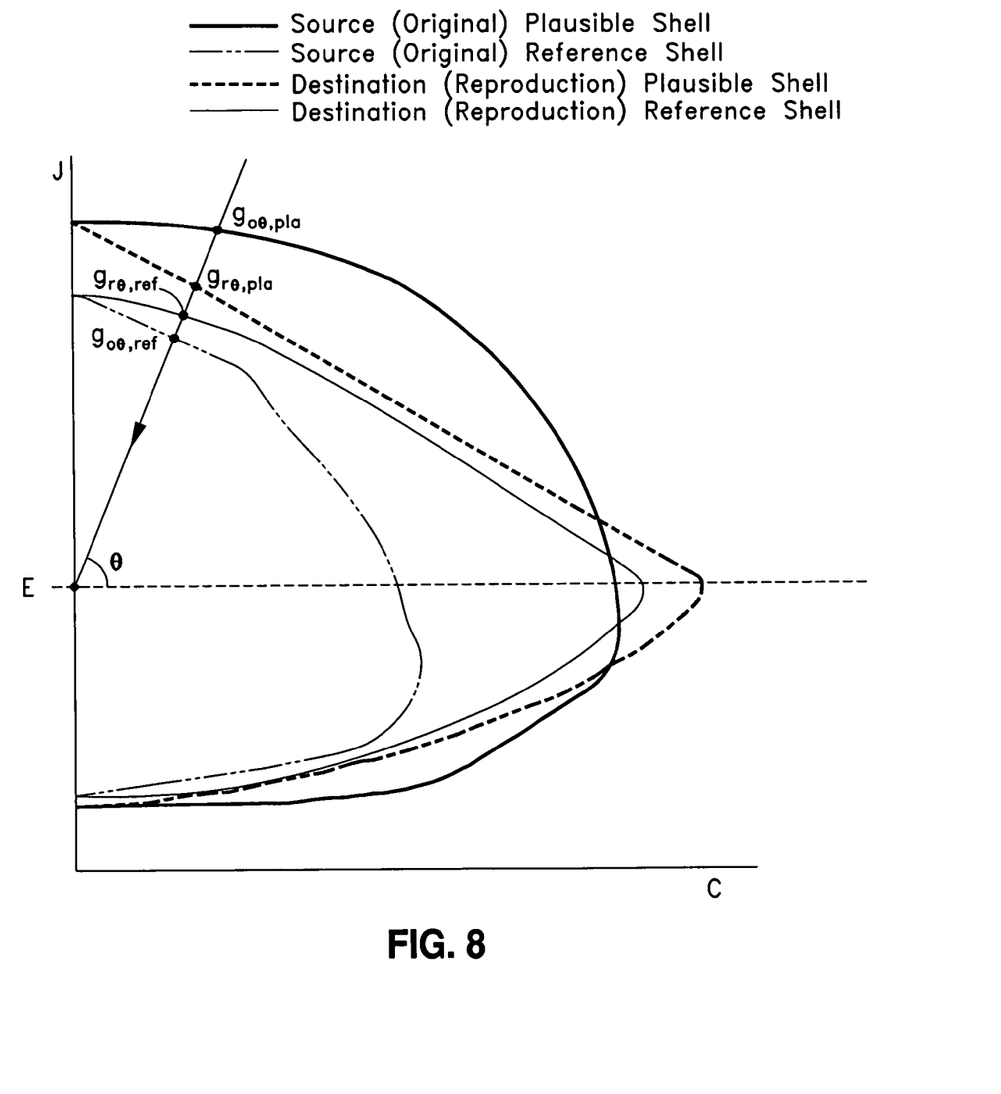
FIG. 8 is a view of the geometry of chroma compression in this embodiment.

After the Lightness Rescaling map has been applied to the destination shells, the source and destination Reference and Plausible Shells are now aligned on the neutral axis. FIG. 8 depicts the general situation, which shows a cross-sectional view of the shells at a hue angle. The hue angle is that of the input point to the SGCK algorithm. The term "hue slices" is used to refer to these cross-sections of the shells. The basic SGCK algorithm says that one should compress the point towards the destination cusp. For multi-shelled GBDs, there are 2 destination shells, and they could have different cusps. A decision would need to be made as to which one to use. In the following discussion, it is assumed that the cusp of the destination Plausible Shell will be used. This point is labeled E in FIG. 8. It should be noted that there is nothing in the algorithm that forbids the choice of using the cusp of the destination's Reference Shell.

Generally speaking, chroma compression according to the invention involves a mapping of the reference shell of the original source to the reference shell of the destination, and a mapping of the plausible shell of the original source to the plausible shell of the destination. As noted above, it is ordinarily unnecessary to consider the entirety of the shells, since a hue slice is ordinarily sufficient to perform the desired mappings.

Similar to the SGCK in the standard case of 1 shell, 90% of the points inside the destination Reference Shell are left intact. The Chroma Compression map is constructed as a piecewise linear function that conforms with the following definition:

$$0 \rightarrow 0$$

$$g_{o\theta,ref} \rightarrow g_{r\theta,ref}$$

$$g_{o\theta,pla} \rightarrow g_{r\theta,pla}$$

$$0.9 g_{r\theta,ref} \rightarrow 0.9 g_{r\theta,ref} \text{ if } 0.9 g_{r\theta,ref} < g_{o\theta,ref}$$

At this point, it may help to clarify a looseness of notation that is employed consistently. The "g" notation appears in both the figures and the equations. When it is used in a figure with hue slices, it refers to a geometric point. When it is used in an equation, it refers to a number, the length of the vector from the point E to the point in question. It should be clear what the context is in every situation.

In order to ensure smoothness and also to forbid chroma expansion, we also clip the resulting piecewise linear function to be bounded above by the identity function, i.e. the compression factor is at most 1. In other words, if PLCM($C_{in}$) is the piecewise linear map constructed using the above 3 or 4 pairs of points, then the final chroma compression map is given by $$C_{out} = \min(PLCM(C_{in}), C_{in})$$

Figure 9A:
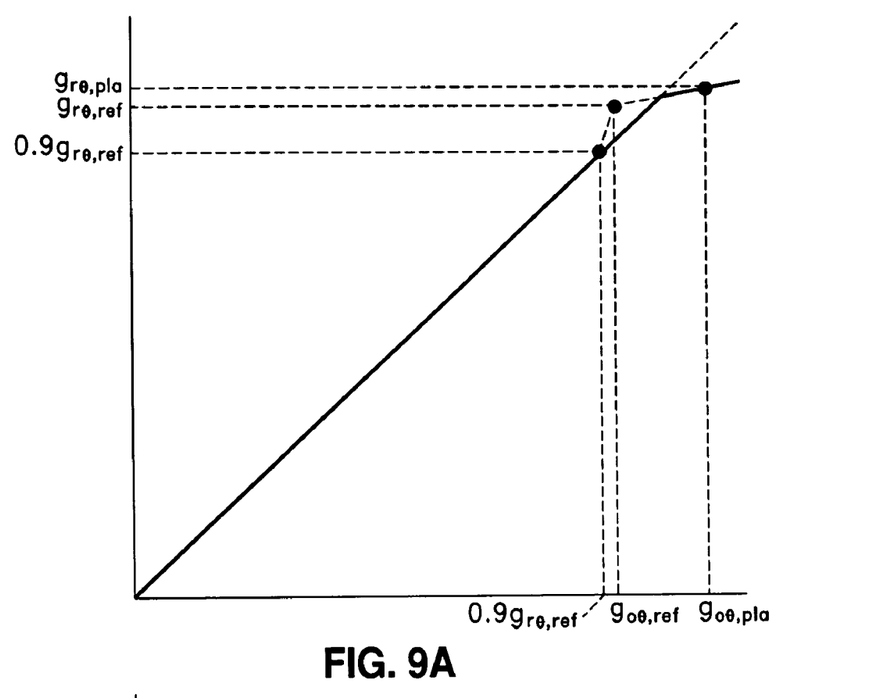
FIGS. 9A, 9B and 9C show the effects of limiting chroma compression by the identity function according to three separate possibilities.
Figure 9B:
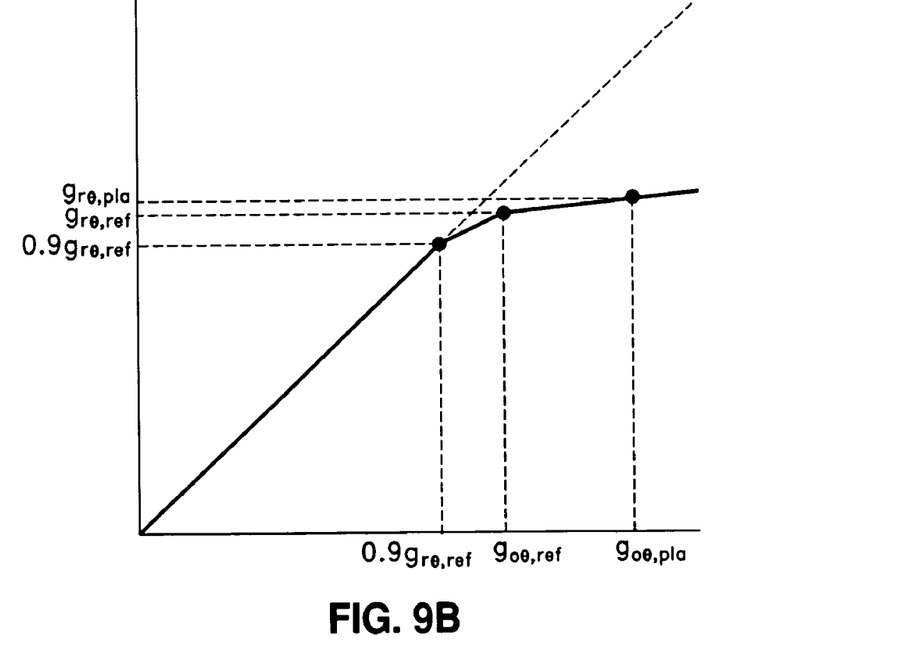
Figure 9C:
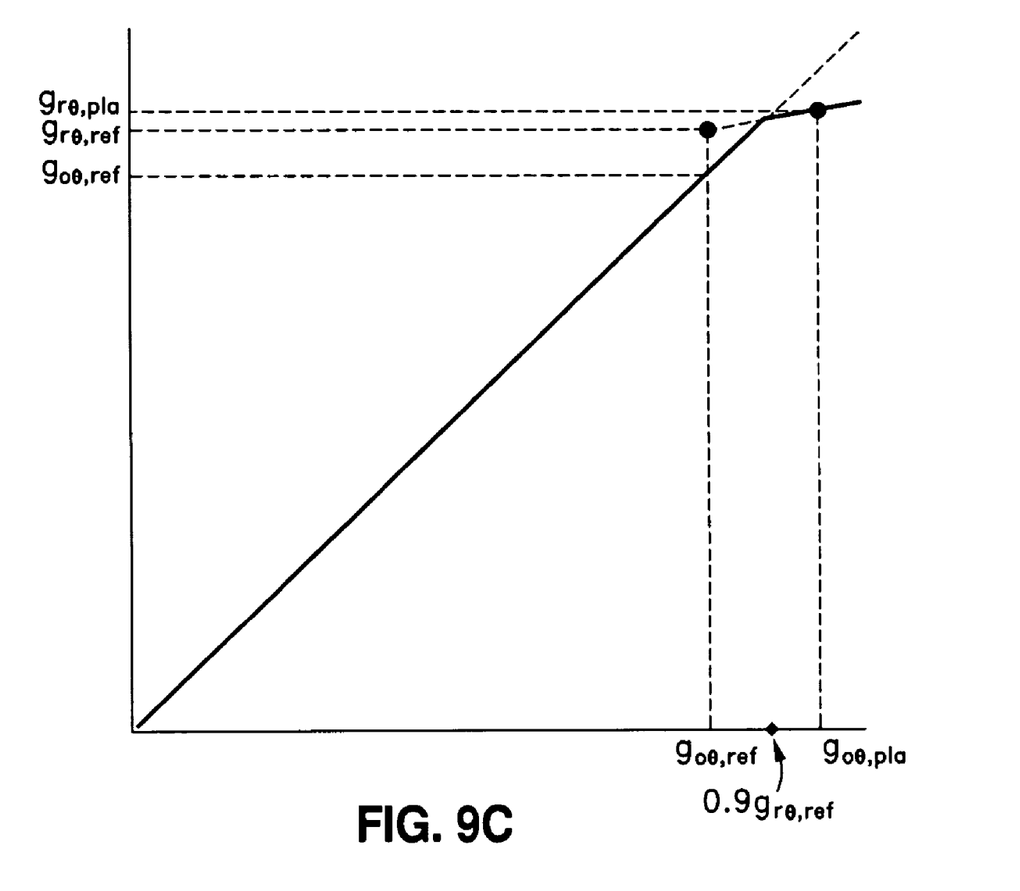

FIG. 9 shows the compression function for some scenarios with different values of the g's.

It should also be noted that in both cases of Lightness Rescaling and Chroma Compression, the algorithm reduces to the 1-shell case when the Reference Shell and Plausible Shell collapse onto one another.

[Induced Hue Slice]

In the mixed cases where one GBD has 1 shell, and the other has 2, a shell is constructed for the GBD with only 1 shell. In fact, it is not actually necessary to construct a shell in the full Jab space. Because SGCK operates on hue slices, it is enough to construct a hue slice.

There are two situations where a hue slice might be constructed. In the first, where the source or destination GBD has only a single shell, then an inner shell is constructed. In the second, the GBD might already have two shells, but one of them is unsuitable or is a poor match with the other, for reasons discussed below. In this second situation, an outer shell is constructed. Discussions of both situations follow.

[Constructing an Inner Shell]

In this case, one shell already exists and we want to construct an artificial shell that is contained in it. The original shell can then be thought of as the Plausible Shell, while the new shell can be thought of as the Reference Shell. For concreteness of the following example, it is assumed that this operation is to be performed on the destination GBD, and the source GBD has already a 2-shell structure. The labels "o" (source) and "r" (destination) can be interchanged without any impact on the following algorithm.

First, the destination Reference hue slice is determined on the neutral axis, i.e. the $j_{r,min,ref}$ and $J_{r,max,ref}$ of the hue slice. This is done using the following algorithm. The determination of these as the first step is often a logical necessity because they are needed to construct the Lightness Rescaling map, which will then be applied to generate the rescaled source shells.

$$J_{r,min,ref} = \frac{J_{r,min,pla} + J_{r,max,pla}}{2} + \lambda_{low}\left(J_{r,min,pla} - \frac{J_{r,min,pla} + J_{r,max,pla}}{2}\right)$$

$$J_{r,max,ref} = \frac{J_{r,min,pla} + J_{r,max,pla}}{2} + \lambda_{high}\left(J_{r,max,pla} - \frac{J_{r,min,pla} + J_{r,max,pla}}{2}\right)$$

The factors $\lambda_{low}$ and $\lambda_{high}$ control the separation between the Plausible Shell and Reference Shell. A value of 1 means the $J_{min}$'s or $J_{max}$'s coincide. Their values are "induced" from the source Reference Shell and source Plausible Shell:

$$J_{mid} = \frac{J_{o,min,ref} + J_{o,max,ref}}{2}$$

$$\lambda_{low} = F_{low} + (1 - F_{low})\frac{J_{mid} - J_{o,min,ref}}{J_{mid} - J_{o,min,pla}}$$

$$\lambda_{high} = F_{high} + (1 - F_{high})\frac{J_{max,ref} - J_{mid}}{J_{o,max,pla} - J_{mid}}$$

The factors $F_{low}$ and $F_{high}$ are tunable parameters that must lie between 0 and 1. If the value is 0, then the $J_{min}$ or $J_{max}$ are directly induced from the source shells. Exemplary values are $F_{low}$=0.95, $F_{high}$=0.1.

The term tunable parameter is used to refer to parameters in the algorithms that are related to aesthetics. Depending on the actual implementation, they may not necessarily be "tunable" in the sense that the system would solicit user input, e.g. a particular system implementing this algorithm may use another algorithm to determine these values. But these parameters are not determined "intrinsically", either mathematically or logically, but rather, by aesthetics, which may depend on the particular situation such as device type.

Figure 10:
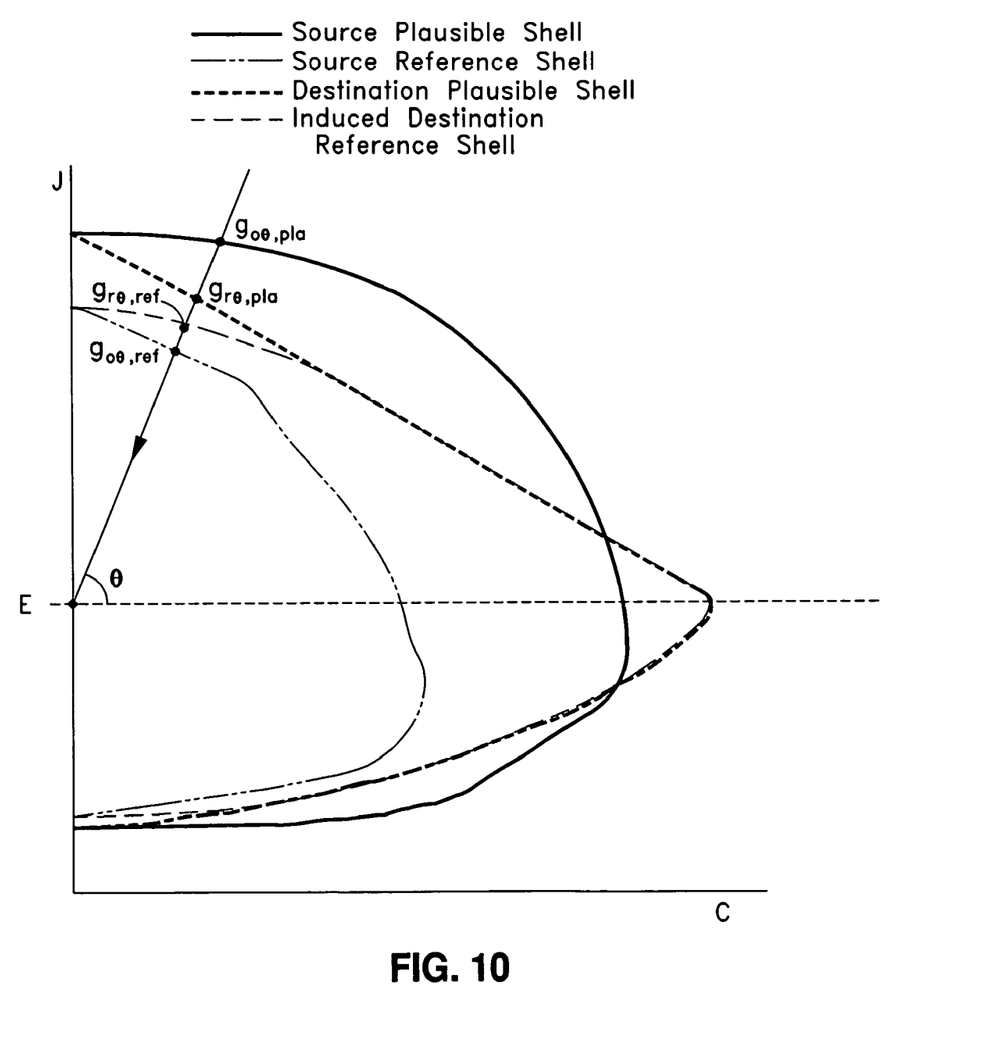
FIG. 10 shows construction of an inner hue slice.

The Lightness Rescaling map may now be constructed. When it is applied to the source shells, the situation is similar to FIG. 8, except that there is no destination Reference Shell, or equivalently, destination Reference hue slice. It is sufficient to define $g_{r\theta,ref}$:

$$g_{r\theta,ref} = g_{r\theta,pla} \cdot \Omega\left(\frac{g_{o\theta,ref}}{g_{o\theta,pla}}, \theta\right)$$

$$\Omega(p, \theta) = 1 - (1 - p)\left(\frac{\theta}{90}\right)^{2n}$$

where n=2 and θ is measured from the positive C-axis in degrees. FIG. 10 shows a typical computation. It is clear that by construction, the induced Reference hue slice has the same cusp as the original Plausible hue slice (θ=0) for the destination, while it matches the $J_{min}/J_{max}$ of the source Reference hue slice (θ→±90) for the original source. In other words, for these values of tunable parameters, when constructing an induced inner hue slice for the reference shell of the destination, the induced hue slice starts at the $J_{max}$ of the source and ends at the $J_{min}$ of the source, but otherwise is close to or approaches the existing outer (plausible) hue slice of the destination.

[Constructing an Outer Shell]

Here the situation is different. A GBD might already have 2 shells, and a shell is constructed lying between them. The new shell will then replace the original Plausible Shell. The reason why a new shell might be needed lies in the Lightness Rescaling map and will be clear from inspection of FIG. 7. It is possible that the straight line pieces at high and low end lightness have very steep slopes. This would be the case if the source Reference and Plausible Shells are very close to each other whereas the destination Reference and Plausible Shells are not. Steep slopes should be avoided in the Lightness Rescaling map because this would cause discontinuity in the tones. This can be achieved by using an intermediate value in $[J_{r,max,ref}, J_{r,max,pla}]$ and/or $[J_{r,min,pla}, J_{r,min,ref}]$ such that the slopes are limited to some predefined value. This in turn necessitates the construction of a new shell, or equivalently hue slice, in between the destination Plausible and Reference Shells.

Figure 11:
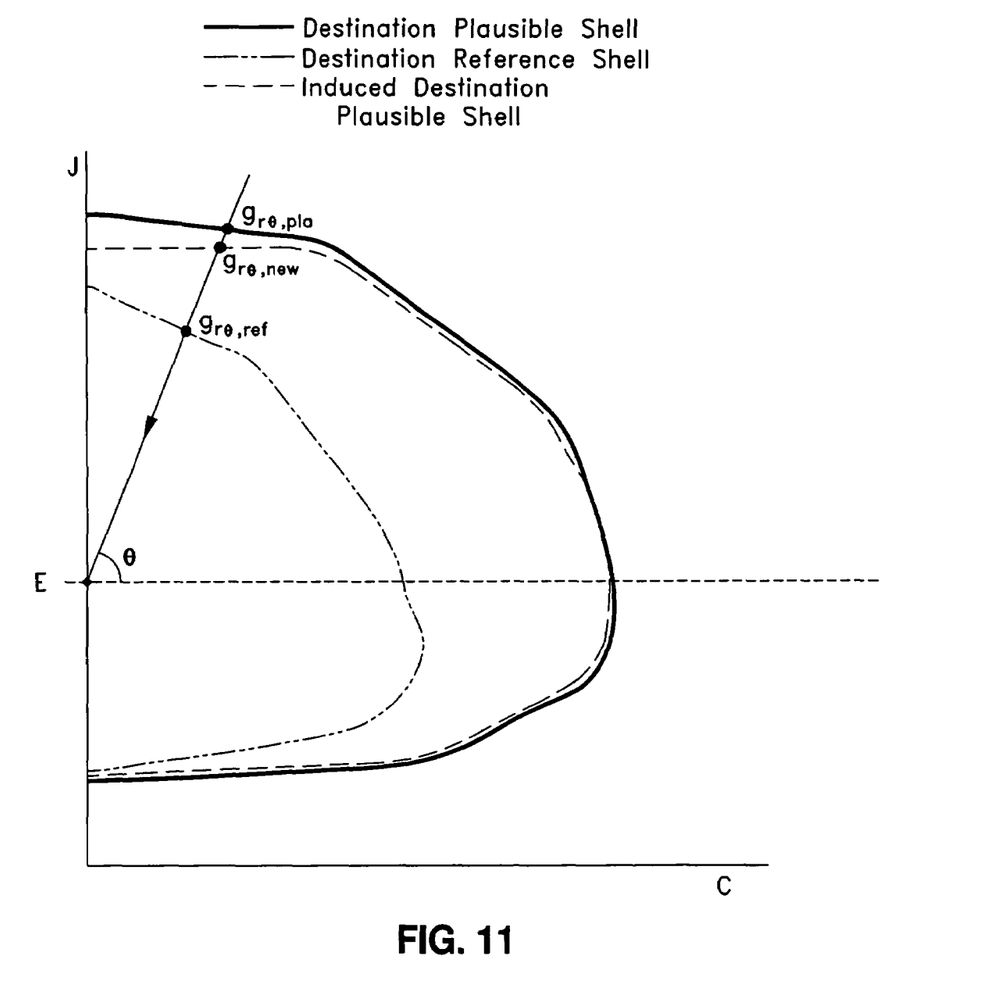
FIG. 11 shows construction of a replacement for an outer hue slice.

To be completely concrete, assume that new $j_{r,max,new}$ and $J_{r,min,new}$ are chosen for the destination Plausible Shell such that $$\frac{J_{r,max,new} - J_{r,max,ref}}{J_{o,max,pla} - J_{o,max,ref}} \leq K$$

$$\frac{J_{r,min,new} - J_{r,min,ref}}{J_{o,min,pla} - J_{o,min,ref}} \leq K$$

where K is a predetermined, acceptable maximum value for the slope, e.g. K=12. This is also a tunable parameter as defined above. Construction of the new shell, or equivalently hue slice, can be specified by $$g_{r\theta,new} = g_{r\theta,ref} + (g_{r\theta,pla} - g_{r\theta,ref}) \cdot \Phi(\theta; p_{low}, p_{high})$$

$$p_{high} = \frac{J_{r,max,new} - J_{r,max,ref}}{J_{r,max,pla} - J_{r,max,ref}}$$

$$p_{low} = \frac{J_{r,min,new} - J_{r,min,ref}}{J_{r,min,pla} - J_{r,min,ref}}$$

$$\Phi(\theta; p_{low}, p_{high}) = \begin{cases} 1 - 1(1 - p_{low})\left(\frac{\theta}{90}\right)^{2n} & \text{if } -90 \leq \theta \leq 0 \\ 1 - 1(1 - p_{low})\left(\frac{\theta}{90}\right)^{2n} & \text{if } 0 < \theta \leq 90 \end{cases}$$

where n=2. It is easy to see that this new shell has the same cusp as the original destination Plausible Shell, see FIG. 11.

[Modified SGCK Gamut Mapping with More than Two Shells]

The following paragraphs elaborate on how the principles outlined above for 2 shells can be used to extend to situations with more than 2 shells. The case of 3 shells is specifically assumed, although practitioners with ordinary skill in the art will be able to recognize the trend and extend it to multiple shells in general.

Denoting the 3 shells by s0, s1 and s2 with s0 being the innermost shell and s2 the outermost shell, while using similar notations otherwise, Lightness Rescaling and Chroma Compression will be generalized as follows.

[Lightness Rescaling with Three Shells]

With input $J_o$, the output $J_r$ is given by:

$$J_r = (1-p_c)J_o + p_c J_s$$

$$p_c = 1 - ((C^3)/(C^3 + 5 \times 10^5))^{1/2}$$

where $J_s$ is defined in a piecewise manner as follows:

$$J_s = \begin{cases} J_{r,max,s1} + \frac{J_{r,max,s2} - J_{r,max,s1}}{J_{o,max,s2} - J_{o,max,s1}}(J_o - J_{o,max,s1}) & \text{if } J_o \geq J_{o,max,s1} \\ J_{r,max,s0} + \frac{J_{r,max,s1} - J_{r,max,s0}}{J_{o,max,s1} - J_{o,max,s0}}(J_o - J_{o,max,s0}) & \text{if } J_{o,max,s1} > J_o \geq J_{o,max,s0} \\ S(J_o; J_{o,min,s0}, J_{o,max,s0}; J_{r,min,s0}, J_{r,max,s0}) & \text{if } J_{o,min,s0} < J_o < J_{o,max,s0} \\ J_{r,min,s0} + \frac{J_{r,min,s1} - J_{r,min,s0}}{J_{o,min,s1} - J_{o,min,s0}}(J_o - J_{o,min,s0}) & \text{if } J_{o,min,s1} < J_o \leq J_{o,min,s0} \\ J_{r,min,s1} + \frac{J_{r,min,s2} - J_{r,min,s1}}{J_{o,min,s2} - J_{o,min,s1}}(J_o - J_{o,min,s1}) & \text{if } J_o \leq J_{o,min,s1} \end{cases}$$

In other words, sigmoidal on the innermost shell, and piecewise linear outside.

[Chroma Compression with Three Shells]

This is again a piecewise linear function specified by the following anchor points:

$0 \rightarrow 0$ $g_{o\theta,s0} \rightarrow g_{r\theta,s0}$ $g_{o\theta,s1} \rightarrow g_{r\theta,s1}$ $g_{o\theta,s2} \rightarrow g_{r\theta,s2}$ $0.9 g_{r\theta,s0} \rightarrow 0.9 g_{r\theta,s0}$ if $0.9 g_{r\theta,s0} < g_{o\theta,s0}$ The resulting piecewise linear function is capped from above by the identity function (diagonal graph) to make sure that chroma expansion and abrupt jump in chroma are disallowed.

[Unequal Number of Shells in Source and Destination GBD]

This describes processing when there are different number of shells in source and destination GBD. Instead of the 4 cases described above when the number of shells is 2, there will be 9 cases when the number of shells is 3, in which 4 cases are already covered if none of the GBDs has more than 2 shells. Of the remaining 5 cases, 2 cases are described in detail below, and the rest of the cases are evident once these 2 cases are understood.

[Case: Source GBD has 3 Shells, Destination GBD has 1 Shell]

2 inner shells are induced for the destination GBD. Using the $J_{max}$ and $J_{min}$ of outermost shell from the source GBD and the $J_{max}$ and $J_{min}$ of the shell from the destination GBD, a (temporary) piecewise linear lightness mapping is constructed that maps one lightness range onto the other, and also maps the mid-points from one to the other. This is the same identical construction used in the section "Constructing an Inner Shell". Using this piecewise linear map, $J_{max}$'s and $J_{min}$'s are induced onto the destination GBD from the $J_{max}$'s and $J_{min}$'s of the innermost and middle shell of the source GBD. An induced shell is then constructed from each pair of $J_{max}/J_{min}$ using the same technique detailed in the section "Constructing an Inner Shell".

[Case: Source GBD has 3 Shells, Destination GBD has 2 Shells]

There is ambiguity in assigning the correspondence of the shells in this case. This is a decision that can only be made when the application is known. Namely, we could set up a correspondence as:

Source outer shell → Destination outer shell
Source inner shell → Destination inner shell
or:
Source outer shell → Destination outer shell
Source middle shell → Destination inner shell Once the decision is made, an induced shell is constructed for the destination GBD accordingly.

In the first scenario, a middle shell is constructed for the destination GBD. Again, the first step is to construct a (temporary) piecewise linear lightness map that respects the assignment of shells. The map can optionally include the mid-point as an anchor point. Once the map is established, the $J_{max}$ and $J_{min}$ of the middle shell for source GBD will induce a pair of $J_{max}/J_{min}$ in the destination. The induced middle shell will need to connect these 2 points. The construction detailed in section "Constructing an Outer Shell" can be used to achieve this. The construction described there constructs a hue slice between 2 known ones that satisfies the boundary conditions imposed by a pair of $J_{max}/J_{min}$.

In the second scenario, the destination (given) inner shell becomes the middle shell, and an inner shell is constructed inside this shell. A piecewise linear lightness map will be established first that respects the given shells and assignment. This map, together with the $J_{max}$ and $J_{min}$ of the inner shell of the source GBD, will then induce the $J_{max}$ and $J_{min}$ for the to-be-constructed inner shell in the destination GBD. These are the boundary conditions for the endpoints for the shell. Using these boundary conditions, a hue slice interior to the destination middle shell is constructed using the construction described in section "Constructing an Inner Shell".

Other decisions as to how to assign source and destination shells can be made, along with other combinations of number of shells in the source and destination GBD. The 2 special cases outlined above should however provide enough clues and details on how to proceed in the general case.

Although the invention has been described with particular illustrative embodiments, the invention is not limited to the above-described embodiments and various changes and modification may be made by those of ordinary skill in the art without departing from the spirit and scope of the invention.

What is claimed is:

1. A method for gamut mapping from a source color in a device independent coordinate system to a destination color in the device independent coordinate system, wherein said method preserves a perceptual rendering intent, said method comprising:

obtaining a gamut boundary descriptor (GBD) for each of the source and the destination, wherein both of the source GBD and the destination GBD each includes at least a first shell and a second shell which is mostly contained by the first shell;

rescaling lightness of the source color to obtain a lightness of the destination color, wherein said lightness rescaling step defines a lightness mapping of the first shell of the source GBD to the first shell of the destination GBD, and of the second shell of the source GBD to the second shell of the destination GBD; and compressing chroma of the source color to obtain chroma of the destination color, wherein said chroma compression step defines a chroma mapping, of the first shell of the source GBD to the first shell of the destination GBD, and of the second shell of the source GBD to the second shell of the destination GBD.

2. The method according to claim 1, wherein the first shell is a plausible shell that is mostly larger than the second shell, and wherein the second shell is a reference shell that is mostly smaller than the plausible shell.

3. The method according to claim 1, wherein the lightness mapping includes a piecewise continuous function which is linear outside the second shells of the source and the destination GBDs and which is sigmoidal between the second shells of the source and the destination GBDs.

4. The method according to claim 3, wherein said lightness mapping includes a weighting factor that depends on chroma of the source color.

5. The method according to claim 1, wherein said chroma mapping includes a piecewise continuous function that is piecewise linear and that compresses chroma towards a cusp in the first shell of the destination GBD.

6. The method according to claim 5, wherein each piecewise linear portion is bounded by the identity function so as to avoid chroma expansion and so as to ensure continuity of the chroma mapping.

7. The method according to claim 1, further comprising construction of an induced hue slice in correspondence to the second shell of the GBD for one of the source and the destination, in a case where said one GBD does not already have both of said first and second shells.

8. The method according to claim 1, further comprising construction of an induced hue slice in correspondence to the first shell of the GBD for one of the source and the destination, in a case where both of said source and destination already have first and second shells but where said step of lightness rescaling results in a lightness mapping that is too steep, wherein the induced hue slice is strictly smaller than the first shell.

9. A method for transforming a source color in a coordinate space that depends on a source device into a destination color in a coordinate space that depends on a destination device, said method comprising the steps of:

transforming the source color from the source device dependent coordinate space to a device independent coordinate space;

applying a gamut mapping algorithm to the transformed source color so as to transform the source color in the device independent coordinate space to a destination color in the device independent coordinate space; and transforming the destination color from the device independent coordinate space to the destination device dependent coordinate space, wherein in said gamut mapping step, a gamut mapping algorithm according to any of claims 1 through 8 is applied.

\* \* \* \* \*